United States Patent
Malladi

(10) Patent No.: US 9,780,912 B2
(45) Date of Patent: Oct. 3, 2017

(54) METHOD AND APPARATUS FOR REDUCING OVERHEAD BASED ON THE ACK CHANNEL

(75) Inventor: Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 886 days.

(21) Appl. No.: 12/443,771

(22) PCT Filed: Oct. 31, 2007

(86) PCT No.: PCT/US2007/083202
§ 371 (c)(1),
(2), (4) Date: Mar. 31, 2009

(87) PCT Pub. No.: WO2008/055222
PCT Pub. Date: May 8, 2008

(65) Prior Publication Data
US 2010/0034156 A1 Feb. 11, 2010

Related U.S. Application Data

(60) Provisional application No. 60/863,789, filed on Oct. 31, 2006.

(51) Int. Cl.
*H04W 72/04* (2009.01)
*H04L 1/00* (2006.01)
*H04L 1/16* (2006.01)
*H04L 1/18* (2006.01)

(52) U.S. Cl.
CPC .......... *H04L 1/0006* (2013.01); *H04L 1/0003* (2013.01); *H04L 1/1607* (2013.01); *H04L 1/1854* (2013.01); *H04L 1/188* (2013.01); *H04L 1/1825* (2013.01)

(58) Field of Classification Search
None
See application file for complete search history.

(56) References Cited

U.S. PATENT DOCUMENTS

| 8,042,018 B2 * | 10/2011 | Heo et al. ................. 714/748 |
| 2003/0072280 A1 | 4/2003 | McFarland et al. |
| 2003/0103483 A1 | 6/2003 | Joshi et al. |

(Continued)

FOREIGN PATENT DOCUMENTS

| EP | 1349292 A2 | 10/2003 |
| JP | 2006246357 A | 9/2006 |

(Continued)

OTHER PUBLICATIONS

International Search Report and Written Opinion, PCT/US2007/083202, European Patent Office, dated Apr. 14, 2008.

(Continued)

*Primary Examiner* — Jae Y Lee
*Assistant Examiner* — Alan Lindenbaum

(57) ABSTRACT

A method and apparatus for a wireless communication system, initially increases resources allocated to an ACKCH as resources allocated to a shared data channel (SDCH), such as a physical downlink shared channel (PDSCH) or a physical uplink shared channel (PUSCH), increases. The resources allocated to ACK are subsequently limited to a predetermined amount.

28 Claims, 8 Drawing Sheets

(56) References Cited

U.S. PATENT DOCUMENTS

| | | | |
|---|---|---|---|
| 2005/0288062 A1 | 12/2005 | Hammerschmidt et al. | |
| 2006/0242025 A1 | 10/2006 | Nishihara et al. | |
| 2006/0262871 A1 | 11/2006 | Cho et al. | |
| 2007/0291691 A1* | 12/2007 | Gorokhov | 370/329 |
| 2008/0080423 A1* | 4/2008 | Kolding et al. | 370/329 |

FOREIGN PATENT DOCUMENTS

| | | | |
|---|---|---|---|
| JP | 2008526089 A | | 7/2008 |
| RU | 2342794 | | 12/2008 |
| TW | 386617 U | | 4/2000 |
| TW | 405328 B | | 9/2000 |
| WO | 0122645 | | 3/2001 |
| WO | WO2004019649 | | 3/2004 |
| WO | WO2004057774 | | 7/2004 |
| WO | WO2004100598 | A1 | 11/2004 |
| WO | WO2006083077 | A1 | 8/2006 |

OTHER PUBLICATIONS

Samsung Electonics Co. Ltd.; "Uplink Multiple Access and Multiplexing for Evolved UTRA", R1-050439, May 3, 2005 (May 3, 2005), pp. 1-22, XP55018616, Retrieved from the Internet: URL:http://www.3gpp.org/ftp/tsg_ran/WG1_R1/TSGR1 / DOCS / [retrieved on Feb. 7, 2012].

Qualcomm Europe, "Considerations on Multiplexing of Control and User Data for xFDMA based E-UTRA Uplink Evaluation", 3GPP TSG-RAN WG1 #42 R1-050899, Aug. 29, 2005, URL, http://www.3gpp.org/ftp/tsg_ran/WG1_RL1/TSGR1_42/Docs/R1-050899.zip.

Qualcomm Europe, "LTE Physical Layer Model", 3GPP TSG-RAN WG2 meeting #52 R2-061038,Mar. 27, 2006, URL, http://www.3gpp.org/ftp/tsg_ran/WG2_RL2/TSGR2_52/Documents/R2-061038.zip.

Qualcomm Europe, "Structure and Link Analysis UL Control Signaling", 3GPP TSG-RAN WG1 #47 R1-063448,Nov. 6, 2006, URL, http://www.3gpp.org/ftp/tsg_ran/WG1_RL1/TSGR1_47/Docs/R1-063448.zip.

Qualcomm Europe, "UL PHY channels—Overall structure", 3GPP TSG-RAN WG1 LTE R1-060477, Feb. 13, 2006, URL, http://www.3gpp.org/ftp/tsg_ran/WG1_RL1/TSGR1_44/Docs/R1-060477.zip.

Taiwan Search Report—TW096141079—TIPO—dated Dec. 3, 2012.

* cited by examiner ional Patent application Serial No. 60/863,789 entitled "A METHOD AND APPARATUS FOR REDUCING OVERHEAD BASED ON ACK CHANNEL" which was filed Oct. 31, 2006. The entirety of the aforementioned applications is herein incorporated by reference.

BACKGROUND

I. Field

The following description relates generally to wireless communications, and more particularly to capping orthogonal resources used for sending acknowledgements (ACK).

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power). Examples of such multiple-access systems may include code division multiple access (CDMA) systems, time division multiple access (TDMA) systems, frequency division multiple access (FDMA) systems, 3GPP LTE systems, orthogonal frequency division multiplexing (OFDM), localized frequency division multiplexing (LFDM), orthogonal frequency division multiple access (OFDMA) systems, and the like.

In a wireless communication system, a Node B (or base station) may transmit data to a user equipment (UE) on the downlink and/or receive data from the UE on the uplink. The downlink (DL) (or forward link) refers to the communication link from the Node B to the UE, and the uplink (UL) (or reverse link) refers to the communication link from the UE to the Node B. The Node B may also send non-data information (e.g., assignments of system resources, acknowledgement (ACK) from the UE and/or a core network. Similarly, the UE may send non-data information to the Node B to support data transmission on the downlink and/or for other purposes.

One type of non-data information exchanged between the UE and Node B is an acknowledgement. An acknowledgement can be sent via an ACKCH to indicate that the information was received on the other end successfully. If an acknowledgement is not received within a predetermined amount of time, data can be retransmitted to the remote receiver.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance an aspect, a method for a wireless communication system, increases resources allocated to an acknowledgment channel (ACKCH) as resources allocated to a shared data channel (SDCH) increases. The shared data channel can be one of a physical downlink shared channel (PDSCH) or a physical uplink shared channel (PUSCH). The resources allocated to the ACKCH are subsequently capped.

In accordance with an aspect, an apparatus operable in a wireless communication system comprises means for increasing orthogonal resources allocated for ACK as orthogonal resources allocated to a shared data channel (SDCH) increases and means for limiting the orthogonal resources allocated for ACK.

In accordance with another aspect, a computer program product comprises instructions which, when executed by a machine, cause the machine to perform operations including capping the orthogonal resources allocated to ACK in a wireless communication system.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
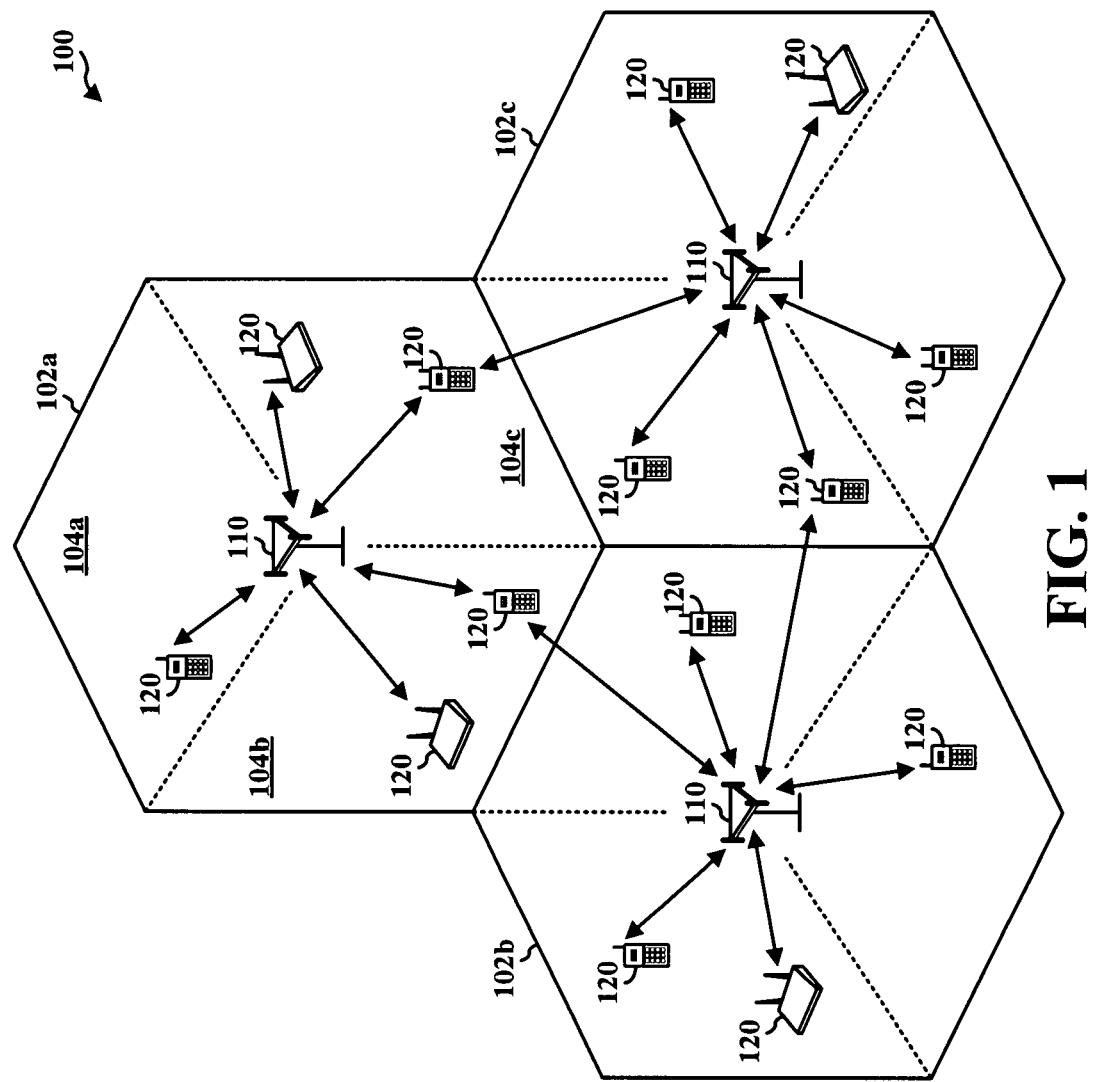
FIG. 1 illustrates a wireless communication system in accordance with various aspects set forth herein.

Various aspects are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

In addition, various aspects of the disclosure are described below. It should be apparent that the teaching herein may be embodied in a wide variety of forms and that any specific structure and/or function disclosed herein is merely representative. Based on the teachings herein one skilled in the art should appreciate that an aspect disclosed herein may be implemented independently of any other aspects and that two or more of these aspects may be combined in various ways. For example, an apparatus may be implemented and/or a method practiced using any number of the aspects set forth herein. In addition, an apparatus may be implemented and/or a method practiced using other structure and/or functionality in addition to or other than one or more of the aspects set forth herein. As an example, many of the methods, devices, systems and apparatuses described herein are descried in the context of an ad-hoc or unplanned/semi-planned deployed wireless communication environment. One skilled in the art should appreciate that similar techniques could apply to other communication environments.

As used in this application, the terms "component," "system," and the like are intended to refer to a computer-related entity, either hardware, software, software in execution, firmware, middle ware, microcode, and/or any combination thereof. For example, a component may be, but is not limited to being, a process running on a processor, a processor, an object, an executable, a thread of execution, a program, and/or a computer. One or more components may reside within a process and/or thread of execution and a component may be localized on one computer and/or distributed between two or more computers. Also, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal). Additionally, components of systems described herein may be rearranged and/or complemented by additional components in order to facilitate achieving the various aspects, goals, advantages, etc., described with regard thereto, and are not limited to the precise configurations set forth in a given figure, as will be appreciated by one skilled in the art.

Furthermore, various aspects are described herein in connection with user equipment. User equipment can also be called a subscriber system, a subscriber unit, mobile station, mobile, remote station, remote terminal, access terminal, user terminal, user agent, a user device, or user equipment. User equipment may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802. 11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for uplink transmission in LTE, and 3GPP terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

LTE utilizes orthogonal frequency division multiplexing (OFDM) on the downlink and single-carrier frequency division multiplexing (SC-FDMA) on the uplink. OFDM and SC-FDM partition the system bandwidth into multiple (N) orthogonal subcarriers, which are also commonly referred to as tones, bins, etc. Each subcarrier may be modulated with data. In general, modulation symbols are sent in the frequency domain with OFDM and in the time domain with SC-FDM. For LTE, the spacing between adjacent subcarriers may be fixed, and the total number of subcarriers (N) may be dependent on the system bandwidth. In one design, N=512 for a system bandwidth of 5 MHz, N=1024 for a system bandwidth of 10 MHz, and N=2048 for a system bandwidth of 20 MHz. In general, N may be any integer value.

FIG. 1 illustrates a wireless communication system 100 with multiple base stations 110 and multiple terminals 120, such as may be utilized in conjunction with one or more aspects. A base station is generally a fixed station that communicates with the terminals and may also be called an access point, a Node B, or some other terminology. Each base station 110 provides communication coverage for a particular geographic area, illustrated as three geographic areas, labeled 102a, 102b, and 102c. The term "cell" can refer to a base station and/or its coverage area depending on the context in which the term is used. To improve system capacity, a base station coverage area may be partitioned into multiple smaller areas (e.g., three smaller areas, according to cell 102a in FIG. 1), 104a, 104b, and 104c. Each smaller area can be served by a respective base transceiver subsystem (BTS). The term "sector" can refer to a BTS and/or its coverage area depending on the context in which the term is used. For a sectorized cell, the BTSs for all sectors of that cell are typically co-located within the base station for the cell. The transmission techniques described herein may be used for a system with sectorized cells as well as a system with un-sectorized cells. For simplicity, in the following description, the term "base station" is used generically for a fixed station that serves a sector as well as a fixed station that serves a cell.

Terminals 120 are typically dispersed throughout the system, and each terminal may be fixed or mobile. A terminal may also be called user equipment, a mobile station, user equipment, a user device, or some other terminology. A terminal may be a wireless device, a cellular phone, a personal digital assistant (PDA), a wireless modem card, and so on. Each terminal 120 may communicate with zero, one, or multiple base stations on the downlink and uplink at any given moment. The downlink (or forward link) refers to the communication link from the base stations to the terminals, and the uplink (or reverse link) refers to the communication link from the terminals to the base stations.

Figure 2:
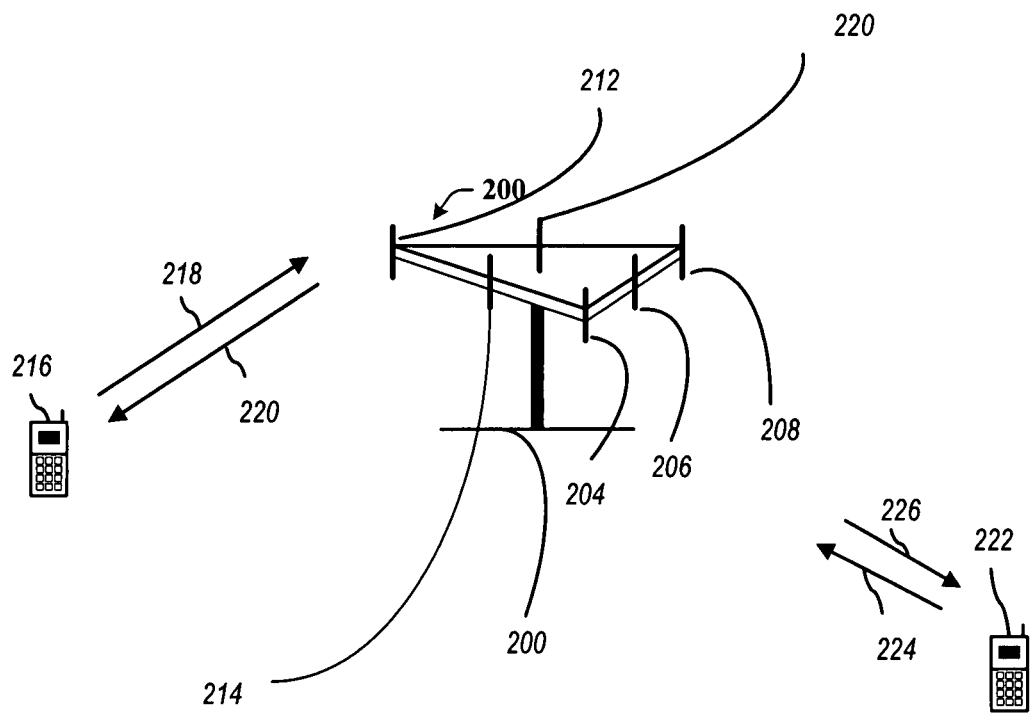
FIG. 2 illustrates forward and reverse links in multiple access wireless communication system according to one aspect herein.

Referring to FIG. 2, a multiple access wireless communication system according to one aspect is illustrated. An access point 200 (AP) includes multiple antenna groups, one including 204 and 206, another including 208 and 210, and an additional one including 212 and 214. In FIG. 2, only two antennas are shown for each antenna group, however, more or fewer antennas may be utilized for each antenna group. Access terminal 216 (AT) is in communication with antennas 212 and 214, where antennas 212 and 214 transmit information to access terminal 216 over forward link 220 and receive information from access terminal 216 over reverse link 218. Access terminal 222 is in communication with antennas 206 and 208, where antennas 206 and 208 transmit information to access terminal 222 over forward link 226 and receive information from access terminal 222 over reverse link 224. In a frequencydivision duplex (FDD) system, communication links 218, 220, 224 and 226 may use different frequency for communication. For example, forward link 220 may use a different frequency than that used by reverse link 218. In a time division duplex (TDD) system, communication links 218, 220, 224, and 226 may use different time slots for communication.

Each group of antennas and/or the area in which they are designed to communicate is often referred to as a sector of the access point. In the embodiment, antenna groups each are designed to communicate to access terminals in a sector, of the areas covered by access point 200.

In communication over forward links 220 and 226, the transmitting antennas of access point 200 utilize beamforming in order to improve the signal-to-noise ratio of forward links for the different access terminals 216 and 224. Also, an access point using beamforming to transmit to access terminals scattered randomly through its coverage causes less interference to access terminals in neighboring cells than an access point transmitting through a single antenna to all its access terminals.

Data transmitted on the forward and reverse links are broken down into various logical channels. In an aspect, logical channels are classified into Control Channels and Traffic Channels. Logical Control Channels comprises Broadcast Control Channel (BCCH) which is DL channel for broadcasting system control information; Paging Control Channel (PCCH) which is DL channel that transfers paging information; and Multicast Control Channel (MCCH) which is Point-to-multipoint DL channel used for transmitting Multimedia Broadcast and Multicast Service (MBMS) scheduling and control information for one or several MTCHs. Generally, after establishing a RRC (radio resource controller) connection this channel is only used by UEs that receive MBMS. Dedicated Control Channel (DCCH) is a point-to-point bi-directional channel that transmits dedicated control information and used by UEs having an RRC connection. In one aspect, Logical Traffic Channels comprises a Dedicated Traffic Channel (DTCH) which is a point-to-point bi-directional channel, dedicated to one UE, for the transfer of user information.

In an aspect, transport Channels are classified into DL and UL. DL Transport Channels comprises a Broadcast Channel (BCH), one or m downlink shared data channels (DL-SDCH) and a Paging Channel (PCH). The UL Transport Channels comprises a Random Access Channel (RACH), a Request Channel (REQCH), and one or more Uplink Shared Data Channels (UL-SDCH). The PHY channels comprise a set of DL channels and UL channels.

The DL PHY channels in one aspect can comprise one or more of a Common Pilot Channel (CPICH), a Synchronization Channel (SCH), a Common Control Channel (CCCH), one or more Physical DL Shared Control Channels (PDSCH), a Multicast Control Channel (MCCH), a Shared UL Assignment Channel (SUACH), an Acknowledgement Channel (ACKCH), a DL Physical Shared Data Channel (DL-PSDCH), an UL Power Control Channel (UPCCH), a Paging Indicator Channel (PICH), and a Load Indicator Channel (LICH).

The UL PHY Channels, according to one aspect, comprises one or more of a Physical Random Access Channel (PRACH), a Channel Quality Indicator Channel (CQICH), an Acknowledgement Channel (ACKCH), an Antenna Subset Indicator Channel (ASICH), a Shared Request Channel (SREQCH), one or more Physical UL Shared Data Channels (PUSCH), and a Broadband Pilot Channel (BPICH).

One skilled in the art will appreciated that various specialized types of these channels can be present in other aspects, such as High Speed DL Physical Shared Data Channel (HS-PDSCH) or a High Speed UL Physical Shared Data Channel (HS-PUSCH).

In an aspect, a channel structure is provided that preserves low PAR (at any given time, the channel is contiguous or uniformly spaced in frequency) properties of a single carrier waveform.

After data is transmitted on the forward link, an ACK is sent on the reverse link to indicate successful receipt of the data. Similarly, after data is transmitted on the reverse link, an ACK is sent on the forward channel. The receipt of an ACK, however, is not directly acknowledged since data is retransmitted if an ACK is not received in a predetermined period of time.

Conventionally, there is no limit on the resources for an acknowledgement channel (ACKCH)—other than the upper bound set by the total available resources—and so resources for an ACKCH increase with the resources for an associated SDCH. For example, if the entire SDCH resources are given to one user, a large amount of corresponding resources are then allocated for the ACKCH. These resources can be resource blocks (RBs) and can comprise orthogonal resources (e.g., orthogonal resources maintained in frequency, code and/or time domains), frequency bandwidth, or time slots. In particular, in typical orthogonal FDMA systems (OFDMA or SC-FDMA), there is an implicit one-to-one mapping between the data and corresponding ACKCH bandwidth and frequency location.

However, this is inefficient since an ACK transmitted in the ACKCH usually involves only a very small amount of data (e.g., data to indicate the block of data being acknowledged, an indication that the data is an acknowledgement, and other routing/control information used for data transmission). Thus, it is possible to more efficiently use resources by capping the resources dedicated to an ACKCH and reusing those resources for other users and/or providing those resources to the SDCH. ACKs can be still be sent via the ACKCH, for example, by including multiple ACKs in a single resource block (RB).

In one aspect, the capping can reduce the ACK overhead if the scheduler is geared towards a time division multiplexing (TDM) operation-one or few users at a time.

The capping can be performed in various manners, such as capping at a predetermined amount of resources or can be capped at a dynamic value depending on the state of the wireless communication system (e.g., the current demand for resources).

Figure 3:
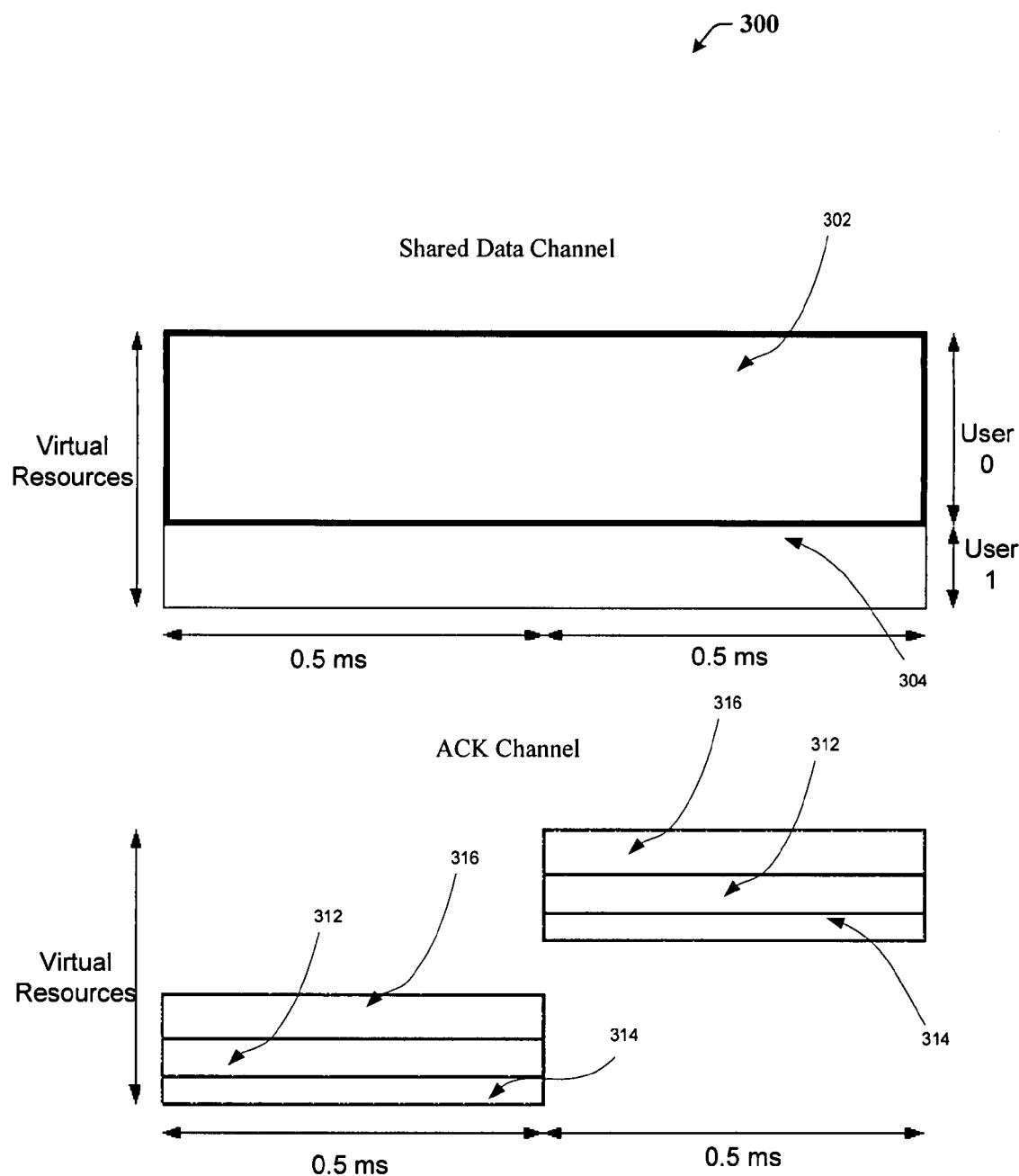
FIG. 3 illustrates an example allocation of resources for a shared data channel (SDCH) and its associated ACK channel according to one aspect disclosed herein.

FIG. 3 illustrates that in accordance with one aspect as the number of SDCH resources allocated for a given user increases, the corresponding ACKCH resources also increases until the resources for the ACKCH are capped. These resources can be bandwidth (FDM), time slots, or number of orthogonal codes in a given bandwidth (CDM) or a combination thereof. For a given user, the number of resources allocated to ACK increases as the number of resources allocated to an associated SDCH increases. However, beyond a certain value (e.g., determined statically or dynamically), the resources are capped off.

In particular, in FIG. 3, a block diagram 300 of allocated resources according to one aspect is illustrated. The two users (User 0 and User 1) are scheduled in the shared data channel (SDCH) and use resources 302 and 304, respectively. User 0 uses twice as much resources as User 1.

Resources 312 and 314 illustrate the corresponding resources allocated for the ACKCH for User 0 and User 1, respectively. In this scenario, although the two users are scheduled to use all the resources of the SDCH, there is still unallocated resources 316 for the ACKCH since the resources 312 allocated for the ACKCH for user 0 are capped.

Figure 4:
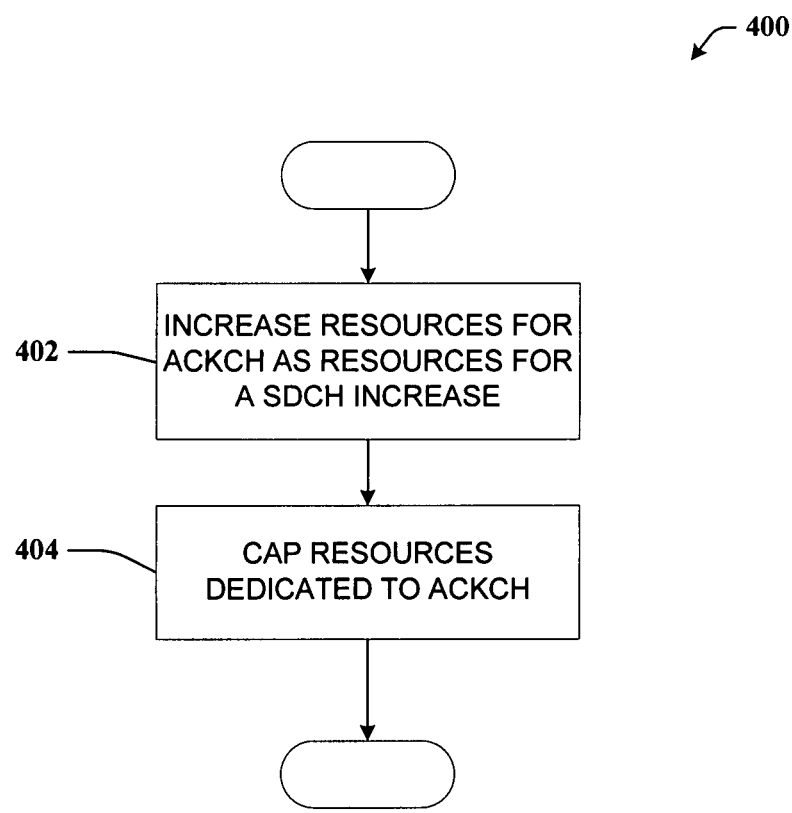
FIG. 4 illustrates a method of an apparatus in a wireless networking environment disclosed herein.
Figure 5:
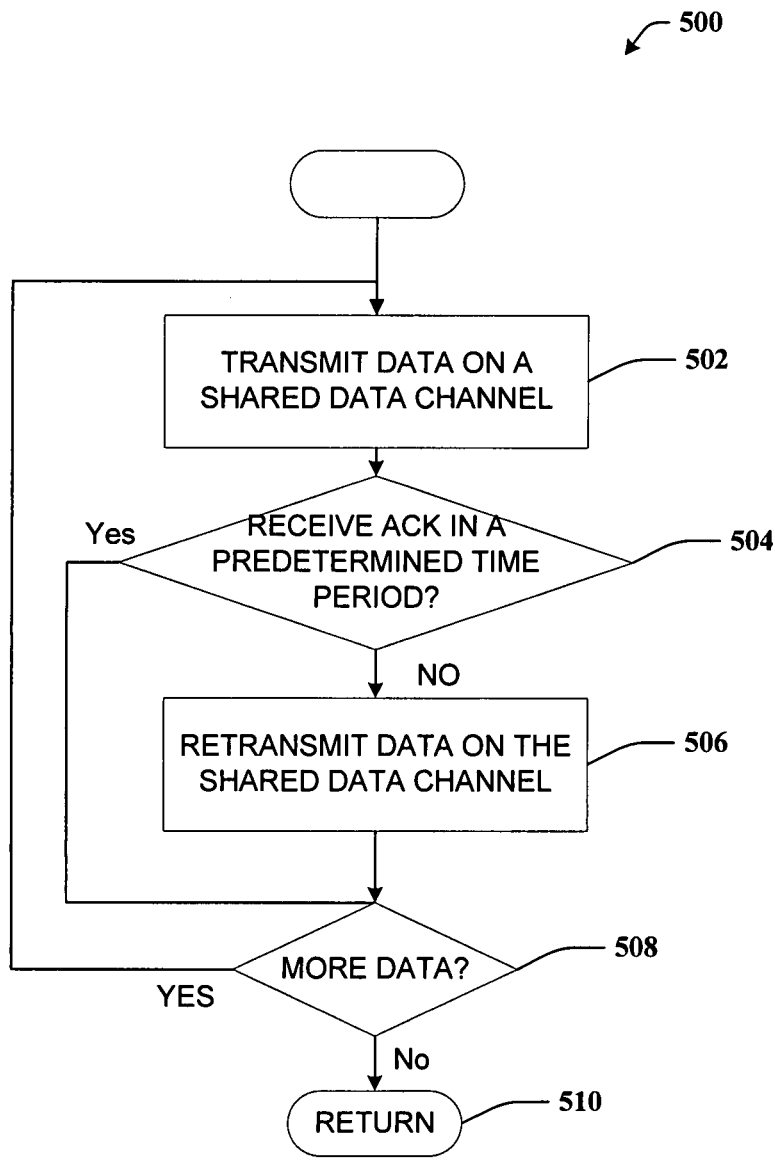
FIG. 5 illustrates a method of data transmission in a wireless networking environment disclosed herein.

Referring to FIGS. 4 and 5, methodologies relating to efficient allocation of orthogonal resources are illustrated in accordance with aspects herein. While, for purposes of simplicity of explanation, the methodologies are shown and described as a series of acts, it is to be understood and appreciated that the methodologies are not limited by the order of acts, as some acts may, in accordance with the claimed subject matter, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Furthermore, those skilled in the art will appreciate that although the methods are shown for a single SDCH, the methods can be performed on multiple shared data channels, such as performed for both an uplink and downlink channel.

Turning to FIG. 4, an example methodology 400 that facilitates efficient use of resources according to an aspect is illustrated. According to an aspect, at block 402, resources are increased for ACKCH as the orthogonal resources given an SDCH increase. At block 404, resources for ACK are capped. The resources can be capped to a predetermined number of resources, such as orthogonal codes or frequency bandwidth.

Turning to FIG. 5, an example methodology 500 for data transmission with acknowledgements according to one aspect is illustrated. According to an aspect, at 502, data is transmitted on a shared data channel (SDCH). The shared data channel can be a physical downlink shared channel (PDSCH) or a physical uplink shared channel (PUSCH). At block 504, the method determines if an acknowledgement is received in a predetermined period of time indicting successful receipt of the data. If it is determined that an acknowledgement is not received in the predetermined period, then at block 506 the data is retransmitted on the shared data channel. After block 506 or if it is determined that the acknowledgement is received, the method executes block 508. At block 508, the method determines if there is more data to transmit. If so, it returns to block 502 and if not, returns at block 510.

Figure 6:
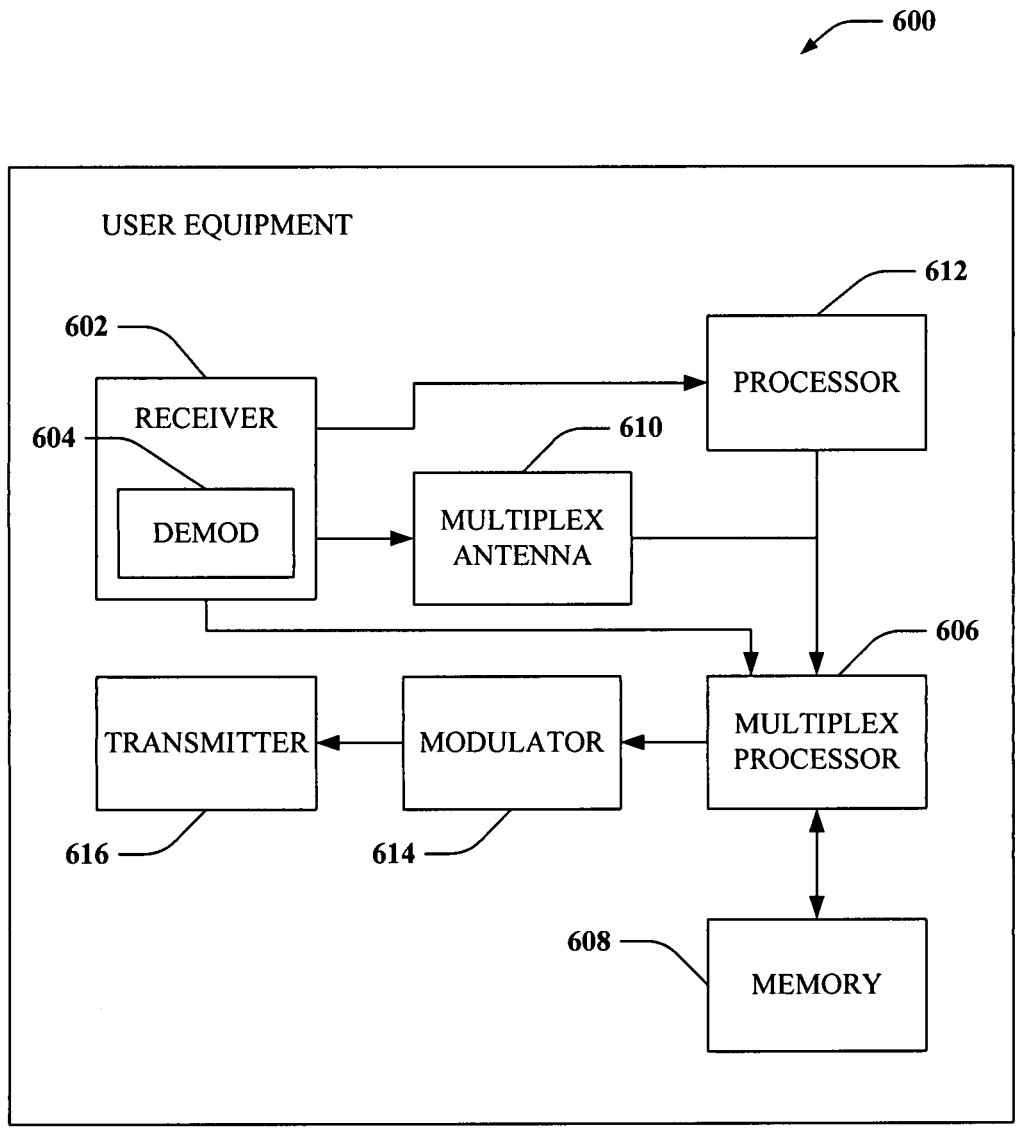
FIG. 6 depicts an exemplary user equipment (UE) system in accordance with one or more aspects.

FIG. 6 depicts exemplary user equipment 600 that can provide feedback to communications networks, in accordance with one or more aspects. Access terminal 600 comprises a receiver 602 (e.g., one or more antennas) that receives a signal and performs typical actions on (e.g., filters, amplifies, downconverts, etc.) the received signal. Specifically, receiver 602 can also receive a service schedule defining services apportioned to one or more blocks of a transmission allocation period, a schedule correlating a block of downlink resources with a block of uplink resources for providing feedback information as described herein, or the like. Receiver 602 can comprise a demodulator 604 that can demodulate received symbols and provide them to a processor 606 for evaluation. Processor 606 can be a processor dedicated to analyzing information received by receiver 602 and/or generating information for transmission by a transmitter 616. Additionally, processor 606 can be a processor that controls one or more components of access terminal 600, and/or a processor that analyzes information received by receiver 602, generates information for transmission by transmitter 616, and controls one or more components of access terminal 600. Additionally, processor 606 can execute instructions for interpreting a correlation of uplink and downlink resources received by receiver 602, identifying un-received downlink block, or generating a feedback message, such as a bitmap, appropriate to signal such un-received block or blocks, or for analyzing a hash function to determine an appropriate uplink resource of a plurality of uplink resources, as described herein.

Access terminal 600 can additionally comprise memory 608 that is operatively coupled to processor 606 and that may store data to be transmitted, received, and the like. Memory 608 can store information related to downlink resource scheduling, protocols for evaluating the foregoing, protocols for identifying un-received portions of a transmission, for determining an indecipherable transmission, for transmitting a feedback message to an access point, and the like.

It will be appreciated that the data store (e.g., memory 608) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 608 of the subject systems and methods is intended to comprise, without being limited to, these and any other suitable types of memory.

Receiver 602 is further operatively coupled to multiplex antenna 610 that can receive a scheduled correlation between one or more additional blocks of downlink transmission resources and a block of uplink transmission resources. A multiplex processor 606 can include a multi-digit bitmap within a feedback message that provides an ACK message indicating whether a first downlink block and each of one or more additional downlink blocks are received or un-received, over a single uplink resource. Further, a processor 612 can perform various functions, as described herein, as well as other functions.

Access terminal 600 still further comprises a modulator 614 and a transmitter 616 that transmits the signal to, for instance, a base station, an access point, another access terminal, a remote agent, etc. Although depicted as being separate from the processor 606, it is to be appreciated that signal generator 610 and indicator evaluator 612 may be part of processor 606 or a number of processors (not shown).

Figure 7:
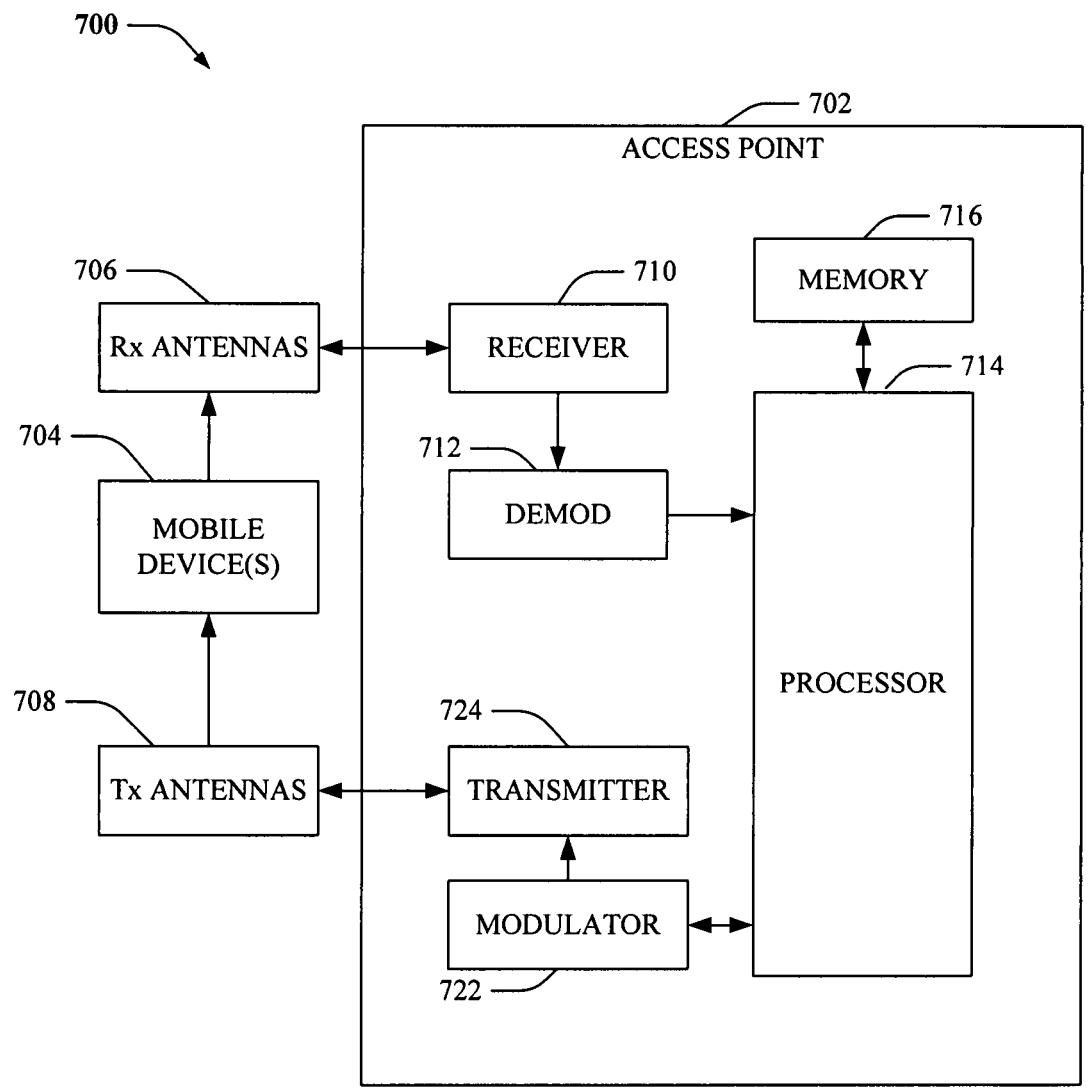
FIG. 7 depicts an exemplary Access Point (AP) system in accordance with one or more aspects.

FIG. 7 is an illustration of a system 700 that facilitates efficient use of orthogonal resources. System 700 comprises a base station 702 (e.g., access point, . . . ) with a receiver 710 that receives signal(s) from one or more mobile devices 704 through a plurality of receive antennas 706, and a transmitter 722 that transmits to the one or more mobile devices 704 through one or more transmit antennas 708. Receiver 710 can receive information from receive antennas 706 and can further comprise a signal recipient (not shown) that receives feedback data related to an un-received or indecipherable data packet. Additionally, receiver 710 is operatively associated with a demodulator 712 that demodulates received information. Demodulated symbols are analyzed by a processor 714 that is coupled to a memory 716 that stores information related to correlating uplink and downlink resources, providing dynamic and/or static correlations from a network, as well as data to be transmitted to or received from mobile device(s) 704 (or a disparate base station (not shown)), and/or any other suitable information related to performing the various actions and functions set forth herein.

The techniques described herein may be implemented by various means. For example, these techniques may be implemented in hardware, software, or a combination thereof. For a hardware implementation, which may be digital, analog, or both digital and analog, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof With software, implementation can be through modules (e.g., procedures, functions, and so on) that perform the functions described herein.

It is to be understood that the embodiments described herein may be implemented in hardware, software, firmware, middleware, microcode, or any combination thereof For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof When the embodiments are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

Figure 8:
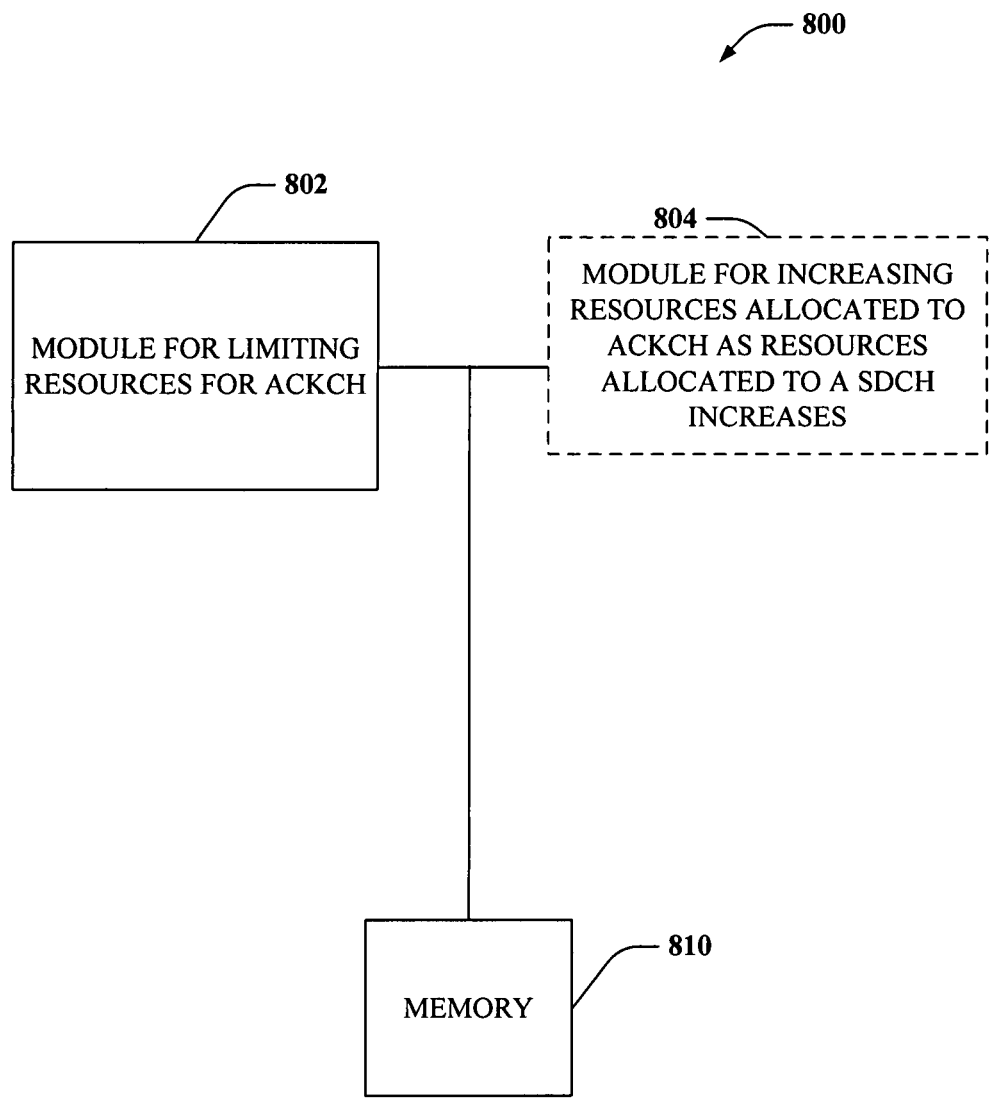
FIG. 8 depicts an exemplary system in conjunction with a wireless communication environment in accordance with one or more aspects.

Referring now to FIG. 8, a system 800 that facilitates efficient allocation of resources is illustrated. System 800 can include a module 802 for limiting resources allocated for an ACKCH and optionally a module 804 for increasing resources allocated to a ACKCH as resources allocated to a shared data channel increase. In one aspect, these modules may be used to control resources allocated to an ACKCH associated each of multiple shared data channels. Modules 802 and 804 can be a processor or any electronic device and may be coupled to memory module 810.

What has been described above includes examples of one or more aspects. It is, of course, not possible to describe every conceivable combination of components or methodologies for purposes of describing the aforementioned aspects, but one of ordinary skill in the art may recognize that many further combinations and permutations of various aspects are possible. Accordingly, the described aspects are intended to embrace all such alterations, modifications and variations that fall within the scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method used in a wireless communication system, the method comprising:
increasing resources allocated for sending acknowledgements (ACKs) of transmissions received on a shared data channel (SDCH) as resources allocated to the SDCH increase; and
capping of the resources allocated for sending the ACKs, per user, such that the resources allocated for sending the ACKs do not increase beyond a predetermined amount of ACK resources for a corresponding increase in the resources allocated to the SDCH.

2. The method of claim 1 further comprising transmitting data on the SDCH and when the data is successfully received by a remote apparatus connected to the wireless communication system, receiving an indication of an ACK.

3. The method of claim 2 further comprising retransmitting data on the SDCH when no indication of an ACK is received within a predetermined period of time.

4. The method of claim 1 wherein the SDCH is at least one of a PDSCH or a PUSCH.

5. The method of claim 1 wherein the predetermined amount of the ACK resources comprises a predetermined amount of at least one of orthogonal codes in frequency or time.

6. The method of claim 1 wherein the resources are orthogonal resources.

7. The method of claim 1 wherein the resources are at least one of a time slot, frequency bandwidth, or orthogonal codes.

8. The method of claim 1 wherein the resources allocated for sending the ACKs are time division multiplexed with other resources allocated to the SDCH.

9. The method of claim 1 wherein the method is performed for multiple shared data channels.

10. The method of claim 1, further comprising using, for the SDCH, resources that are not allocated for sending the ACKs as a result of the capping of the resources allocated for sending the ACKs.

11. An apparatus operable in a wireless communication system, the apparatus comprising:
means for increasing resources allocated for sending acknowledgements (ACKs) of transmissions received on a shared data channel (SDCH), as resources allocated to the SDCH increase; and
means for limiting the resources allocated for sending the ACKs, per user, such that the resources allocated for sending the ACKs do not increase beyond a predetermined amount of ACK resources for a corresponding increase in the resources allocated to the SDCH.

12. The apparatus of claim 11 wherein the SDCH is one of a physical downlink shared channel (PDSCH) or a physical uplink shared channel (PUSCH).

13. The apparatus of claim 11 wherein the predetermined amount of the ACK resources comprises a predetermined amount of at least one of orthogonal codes in frequency or time.

14. The apparatus of claim 11 wherein the resources are orthogonal resources.

15. The apparatus of claim 11 wherein the resources are at least one of a time slot, frequency bandwidth, or orthogonal codes.

16. The apparatus of claim 11 wherein the apparatus is one of an eNodeB or an access terminal.

17. The apparatus of claim 11 wherein the means for increasing resources allocated for sending ACKs of transmissions received on the SDCH increases orthogonal resources allocated for ACKs for each shared data channel used by the apparatus and the means for limiting the resources allocated for sending the ACKs limits the orthogonal resources allocated for the ACKs for each shared data channel.

18. The apparatus of claim 11, wherein the resources allocated for sending the ACKs are time division multiplexed with other resources allocated to the SDCH.

19. An apparatus operable in a wireless communication system, the apparatus comprising:
one or more processors, configured for:
increasing resources allocated for sending acknowledgements (ACKs) of transmissions received on a shared data channel (SDCH) as resources allocated to the SDCH increase; and
limiting the resources allocated for sending the ACKs, per user, such that the resources allocated for sending the ACKs do not increase beyond a predetermined amount of ACK resources for a corresponding increase in the resources allocated to the SDCH; and
a memory coupled to the one or more processors for storing data.

20. The apparatus of claim 19 wherein the predetermined amount of the ACK resources comprises a predetermined amount of orthogonal resources.

21. The apparatus of claim 19 wherein the shared data channel is at least one of a PDSCH or a PUSCH.

22. The apparatus of claim 19 wherein the apparatus is one of an eNodeB or an access terminal.

23. The apparatus of claim 19 wherein the wireless communication system is based on at least one of Orthogonal Frequency Division Multiple Access (OFDMA) or Single-Carrier FDMA (SC-FDMA).

24. The apparatus of claim 19, wherein the resources allocated for sending the ACKs are time division multiplexed with other resources allocated to the SDCH.

25. A non-transitory computer-readable medium having instructions stored thereon, which, when executed by a machine, cause the machine to perform operations including:
capping of resources allocated for sending acknowledgements (ACKs), per user, in a wireless communication system such that the resources allocated for sending the ACKs for transmissions received on a shared data channel (SDCH) do not increase beyond a predetermined amount of ACK resources for a corresponding increase in resources allocated to the SDCH.

26. The computer-readable medium of claim 25 wherein the operations further include increasing number of the resources allocated for sending the ACKs as the resources allocated to the SDCH increase.

27. The computer-readable medium of claim 25 wherein the wireless communication system is based on Frequency Domain Multiple Access (FDMA).

28. The computer-readable medium of claim 25, wherein the resources allocated for sending the ACKs are time division multiplexed with other resources allocated to the SDCH.

\* \* \* \* \*